United States Patent
Kornfeld et al.

(10) Patent No.: US 10,474,565 B2
(45) Date of Patent: Nov. 12, 2019

(54) ROOT CAUSE ANALYSIS OF NON-DETERMINISTIC TESTS

(71) Applicant: MICRO FOCUS LLC, Santa Clara, CA (US)

(72) Inventors: Lital Kornfeld, Yehud (IL); Effi Bar She'an, Yehud (IL); Talia Rogov, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 170 days.

(21) Appl. No.: 15/540,086

(22) PCT Filed: Jan. 16, 2015

(86) PCT No.: PCT/US2015/011810
§ 371 (c)(1),
(2) Date: Jun. 27, 2017

(87) PCT Pub. No.: WO2016/114794
PCT Pub. Date: Jul. 21, 2016

(65) Prior Publication Data
US 2018/0300229 A1    Oct. 18, 2018

(51) Int. Cl.
*G06F 11/00* (2006.01)
*G06F 11/36* (2006.01)
*G06F 11/07* (2006.01)

(52) U.S. Cl.
CPC ...... *G06F 11/3692* (2013.01); *G06F 11/0709* (2013.01); *G06F 11/079* (2013.01); *G06F 11/3688* (2013.01)

(58) Field of Classification Search
CPC .............. G06F 11/3692; G06F 11/079; G06F 11/3688; G06F 11/3672; G06F 11/3668
See application file for complete search history.

(56) References Cited

U.S. PATENT DOCUMENTS

| 7,305,466 | B1 | 12/2007 | Kaffine et al. |
| 7,757,124 | B1 | 7/2010 | Singh et al. |
| 8,707,272 | B2 | 4/2014 | Ganai |
| 8,826,084 | B1 | 9/2014 | Gauf et al. |

(Continued)

FOREIGN PATENT DOCUMENTS

WO    2012066091    5/2012

OTHER PUBLICATIONS

Tzoref, et al., "Instrumenting Where It Hurts—An Automatic Concurrent Debugging Technique", ISSTA'07, Jul. 9-12, 2007, London, England, United Kingdom, 11 pages.

(Continued)

*Primary Examiner* — Philip Guyton

(57) ABSTRACT

Example implementations relate to root cause analysis of non-deterministic tests. In response to detecting a non-deterministic test of an application under test, some implementations may cause rerun executions of the non-deterministic test. Some implementations may also capture data during the rerun executions. The data may include application data, test data, and environment data. Some implementations may also analyze the captured data to determine a root cause of a failure of the non-deterministic test. The analysis may be based on a comparison between failed rerun executions and passed rerun executions.

13 Claims, 4 Drawing Sheets

(56) References Cited

U.S. PATENT DOCUMENTS

| | | | |
|---|---|---|---|
| 9,311,220 B1* | 4/2016 | Ha | G06F 11/3636 |
| 2003/0046609 A1 | 3/2003 | Farchi et al. | |
| 2010/0025103 A1 | 2/2010 | Storrie et al. | |
| 2011/0296383 A1 | 12/2011 | Pasternak | |
| 2013/0036405 A1 | 2/2013 | Verbest | |
| 2016/0328281 A1* | 11/2016 | Lee | G06F 11/277 |
| 2017/0351599 A1* | 12/2017 | Elimeleh | G06F 11/2635 |
| 2018/0300229 A1* | 10/2018 | Kornfeld | G06F 11/0709 |

OTHER PUBLICATIONS

International Search Report and Written Opinion for PCT Application No. PCT/US2015/011810, dated Sep. 16, 2015, 12 pages.
"What is Chronon?", webpage Chronon DVR for Java, posted online on Apr. 29, 2013, 2 pages. <https://web.archive.org/web/20130429033130/http://chrononsystems.com/what-is-chronon/technology>.
Microsoft Research, "CHESS: Find and Reproduce Heisenbugs in Concurrent Programs", Jan. 9. 2014, 2 pages. <https://web.archive.org/web/20140109150118/http://research.microsoft.com/en-us/projects/chess/>.
OpenJDK, "Code Tools: jcstress", webpage posted online on Apr. 9, 2014, 2 pages. <https://web.archive.org/web/20140409113329/http://openjdk.java.net/projects/code-tools/jcstress/>.

* cited by examiner

ROOT CAUSE ANALYSIS OF NON-DETERMINISTIC TESTS

BACKGROUND

To speed up processing, concurrent applications may execute several streams of operations at the same time using multiple threads. For example, each stream of operation may execute as it would in a sequence but may also potentially interact with other streams that are executing at the same time. Because these streams may interact with each other during execution, multi-threaded applications may perform operations in an unpredictable manner. Furthermore, multi-threaded applications may include a large number of execution paths.

BRIEF DESCRIPTION OF THE DRAWINGS

The following detailed description references the drawings, wherein.

DETAILED DESCRIPTION

Figure 1:
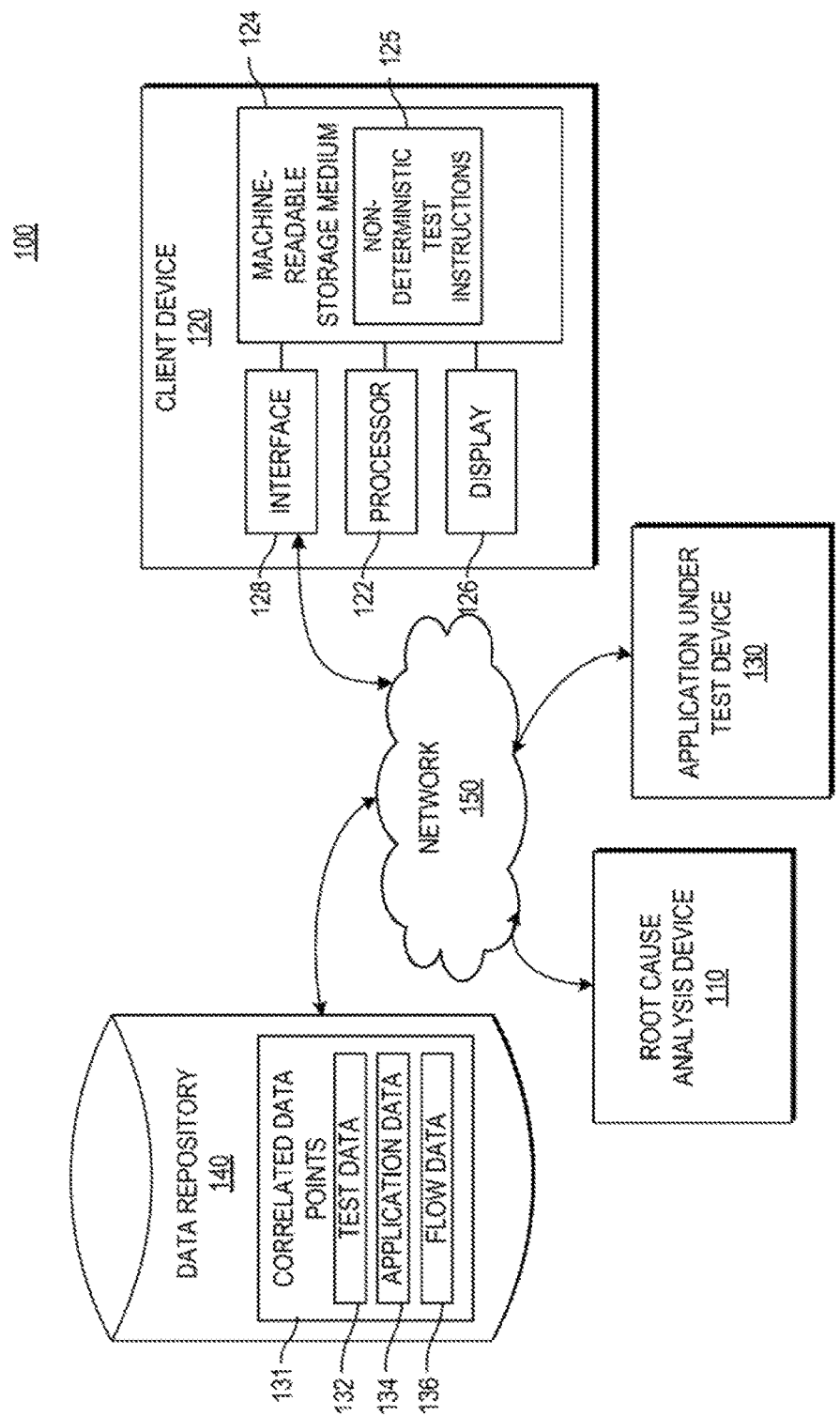
FIG. 1 is a block diagram of an example system for root cause analysis of non-deterministic tests.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

Traditionally, concurrent applications have been difficult to test due to the large number of execution paths available in concurrent applications. Specifically, many tests on concurrent applications are non-deterministic, in that some executions of the test pass and some executions of the test fail. These different results may be due, in part, to concurrency issues. For example, because the same operation may be executing in one path in one test execution and a completely different path in another test execution, the outcomes of the tests may differ even though the test is, the same.

Traditional methods of troubleshooting non-deterministic tests may require extensive developer involvement, and may not result in the identification of the root cause of any failures. For example, traditional methods of troubleshooting may include generating an application crash log after the test has executed that includes a complete stack trace for every executing thread that was running when the application terminated. An application developer may have to manually review a significant amount of information in the log to determine where the error was thrown in that one test execution, and, even if the crash log included the appropriate data, it may be difficult to determine which particular action caused the error. Accordingly, traditional methods of troubleshooting application errors may involve significant manual intervention and/or be based on an individual analysis of each failed execution.

Examples disclosed herein provide root cause analysis of non-deterministic tests. To this end, example implementations disclosed herein may provide root cause analysis by automatically causing rerun executions of a non-deterministic test, capturing data during the rerun executions, and analyzing the captured data to determine a root cause of a failure of the non-deterministic test. For example, in some implementations, the data may be captured by instrumenting a portion of the application under test ("AUT") with instrumentation code, executing the instrumentation code to capture the data, and analyzing the captured data based on a comparison between failed rerun executions and passed rerun executions of the non-deterministic test. Thus, in some examples, the identification of potential root causes of a failure of the non-deterministic test s performed automatically and may be based on both passed and failed executions of the non-deterministic test.

Referring now to the drawings, FIG. 1 is a block diagram of an example system 100 for root cause analysis of non-deterministic tests. System 100 may be implemented in a number of different configurations without departing from the scope of the disclosed example. In the example shown in FIG. 1, system 100 may include a root cause analysis device 110, a client device 120, an AUT device 130, a data repository 140, and a network 150 for connecting root cause analysis device 110 with client device 120, AUT device 130, and/or data repository 140.

Root cause analysis device 110 may be a computing system that performs various functions consistent with disclosed examples. For example, root cause analysis device 110 may be a server, a desktop computer, a laptop computer, and/or any other suitable type of computing system to determine a root cause of a failure of a non-deterministic test consistent with disclosed implementations. In some examples, root cause analysis device 110 may process information received from client device 120. AUT device 130, and/or data repository 140. For example, root cause analysis device 110 may capture data during rerun executions of a non-deterministic test and the analyze captured data to determine a root cause of a failure of the non-deterministic test. Examples of root cause analysis device 110 and certain functions that may be performed by device 110 are described in greater detail below with respect to, for example, FIGS. 2 and 3.

Client device 120 may be a computing system operated by a user. For example, client device 120 may be a desktop computer, a laptop computer, a tablet computing device, a mobile phone, a server, and/or any other type of computing system. In some examples, client device 120 may be a computing system to perform operations consistent with certain disclosed implementations. For example, client device 120 may be adapted to transmit data related to rerun executions of a non-deterministic test to root cause analysis deice 110, such as, for example, data related to action steps performed during application testing, environment data related to the environment of the testing application, and/or any other suitable data. For example, client device 120 may be a computing system operated by a tester of an AUT and thus client device 120 may be adapted to transmit test data to root cause analysis device 110.

Client device 120 may include a processor to execute instructions stored in a machine-readable storage medium. In the example shown in FIG. 1, client device 120 may include a processor 122, a machine-readable storage medium 124, a display device 126, and an interface 128. Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as non-deterministic test execution instructions 125, which may function to test an AUT), Machine-readable storage medium 124 may be any electronic, magnetic, optical, or other non-transitory storage device that stores instructions executed by processor 122. Display device 126 may be any type of display device that presents information, such as a user interface of an AUT and/or a testing, application, to a user (e.g., a tester) operating client device 120. Interface device 128 may be any combination of hardware and/or programming that facilitates the exchange of data between the internal components of client device 120 and external components, such as root cause analysis device 110. In some examples, interface device 128 may include a network interface device that allows client device 120 to receive and send data to and from various components, such as to and from root cause analysis device 110 via network 150.

AUT device 130 may be a computing system operated by the content provider of an application. For example, AUT device 130 may be a desktop computer, a laptop computer, a tablet computing device, a server, and/or any other type of computing device, in some examples, AUT device 130 may be a computing system that executes the AUT and/or is capable of receiving a request from root cause analysis device 110 to capture data during rerun executions of a non-deterministic test such as, for example, application data, test data, and environment data of the AUT. This data may be stored in a storage device, such as data repository 140.

Data repository 140 may be any type of storage system configuration that facilitates the storage of data. For example, data repository 140 may facilitate the locating, accessing, and retrieving of data captured during rerun executions of a non-deterministic test (e.g., SaaS, SQL, Access, etc. databases). Data repository 140 can be populated by a number of methods. For example, root cause analysis device 110, client device 120, and/or AUT device 130 may populate data repository 140 by receiving, generating, and/or otherwise accessing data related to the rerun executions and storing the data in data repository 140. While in the example shown in FIG. 1 data repository 140 is a single component external to components 110, 120, and 130, data repository 140 may comprise separate components and/or may be part of devices 110, 120, 130, and/or another suitable device or system. In some implementations, data repository 140 may be managed by components of device 110 and/or other devices that are capable of accessing, creating, controlling and/or otherwise managing data remotely through network 150.

Network 150 may be any type of network that facilitates communication between remote components, such as root cause analysis device 110, client device 120, AUT device 130, and/or data repository 140. For example, network 150 may be a local area network (LAN), a wide area network (WAN), a virtual private network, a dedicated Intranet, the Internet, and/or a wireless network.

The arrangement illustrated in FIG. 1 is simply an example, and system 100 may be implemented in a number of different configurations. For example, while FIG. 1 shows one root cause analysis device 110, client device 120, AUT device 130, data repository 140, and network 150, system 100 may include any number of components 110, 120, 130, 140, and 150 as well as other components not depicted in FIG. 1. For example, system 100 may omit any of components 110, 120, 130, 140, and 150 and/or the functionality of at least one of components 110, 120, 130, 140, and 150 may be incorporated into another component or split between other components (e.g., components 110, 120, 130, 140, 150 and/or a component not shown in FIG. 1).

Figure 2:
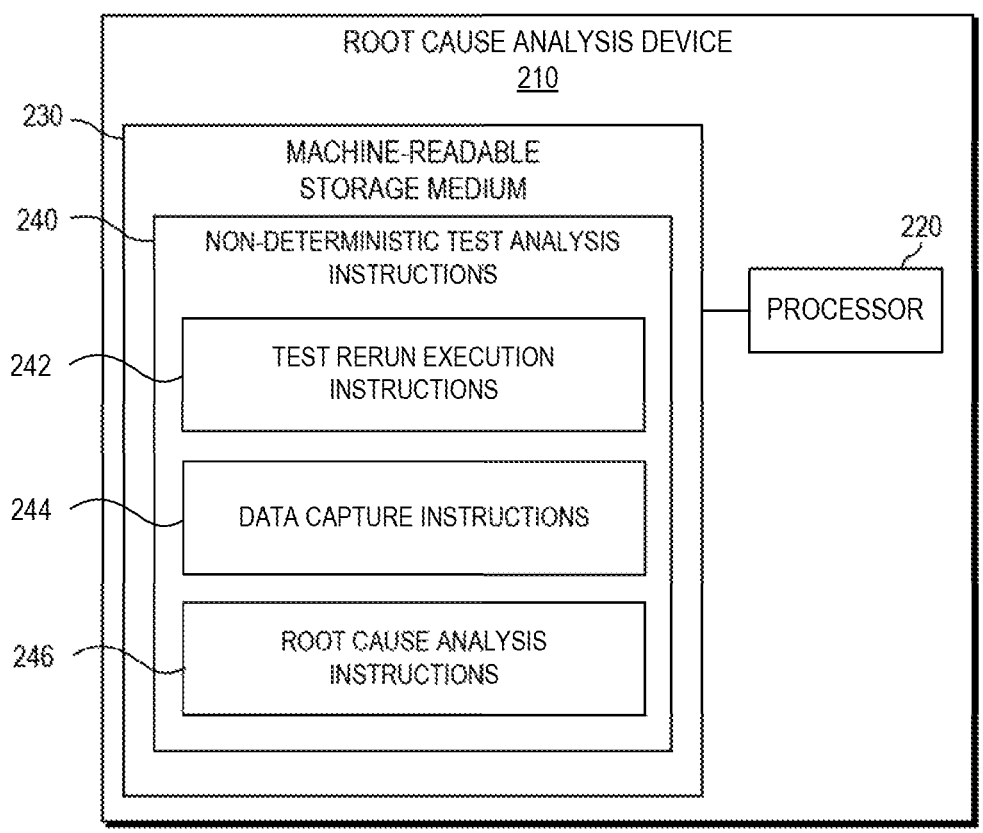
FIG. 2 is a block diagram of an example root cause analysis device consistent with disclosed implementations.

FIG. 2 is a block diagram of an example root cause analysis device 210 consistent with disclosed implementations. In certain aspects, root cause analysis device 210 may correspond to root cause analysis device 110 of FIG. 1. Root cause analysis device 210 may be implemented in various ways. For example, device 210 may be a special purpose computer, a server, a mainframe computer, and/or any other type of computing system. In the example shown in FIG. 2, root cause analysis device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute non-deterministic test analysis instructions 240 (e,g, instructions 242, 244, and/or 246) stored in machine-readable storage medium 230 to perform operations consistent with disclosed examples.

Machine-readable storage medium 230 may be any electronic, magnetic, optical, or other physical storage device that stores executable instructions. Thus, machine-readable storage medium 230 may be, for example, memory, a storage drive, an optical disc, and the like. In sonic implementations, machine-readable storage medium 230 may be a non-transitory machine-readable (e.g., computer-readable) storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 230 may include instructions that perform operations to execute a root cause analysis of a non-deterministic test by causing rerun execution of the non-deterministic test, capturing data during the rerun executions, and analyzing the captured data to determine a root cause of a failure of the non-deterministic test based on a comparison between failed rerun executions and passed rerun executions. In the example shown in FIG. 2, machine-readable storage medium 230 may include test rerun execution instructions 242, data capture instructions 244, and root cause analysis instructions 246.

Test rerun execution instructions 242 may function to cause, in response to detecting a non-deterministic test of an AUT, rerun executions of the non-deterministic test. For example, when test rerun execution instructions 242 are executed by processor 220, test rerun execution instructions 242 may cause processor 220 and/or another processor to detect a non-deterministic test. In some implementations, test rerun executions may detect a non-deterministic test based on data gathered during original executions of a test. For example, original executions of a test may be executed on a testing device, such as client device 120 of FIG. 1. During these original executions, a testing application (e.g., non-deterministic test instructions 125) may function to record information related to the original executions, such as whether the test has passed or failed, a time of the last modification of the code of the AUT, a time of the last modification of the code of the non-deterministic test, and/or any other suitable information. The information may be stored in a storage device (e.g., data repository 140) and/or otherwise transmitted to another component (e.g., root cause analysis device 210) for analysis. The analysis may include determining whether some of the original executions of the test have passed while others have failed without any change to the code of the AUT or a code of the test (e.g., the non-deterministic test). For example, if some of the original executions have passed while others have failed, and there has been no change to the code of the AUT and the code of the test (i.e., alternate causes for the non-deterministic nature of the test), test rerun execution instructions 242 may function to detect that the test is a non-deterministic test of the AUT. In some examples, if a test has been determined to be a non-deterministic test, the original executions of the test may be considered to be original executions of a non-deterministic test.

In some implementations, when test rerun execution instructions 242 are executed by processor 220, test rerun execution instructions 242 may cause processor 220 and/or another processor to cause rerun executions of the non-deterministic test in response to detecting the non-deterministic test. The detection of the non-deterministic test may be performed by root cause analysis device 110 (e.g., as described above) or by another component. The number of rerun executions that are caused by the execution of test rerun execution instructions 242 may be a static number or may be a variable number. In some implementations, the number of rerun executions may be a predefined number that is the same for all tests. In some implementations, the number of the rerun executions may be determined based on at least one of a length of time to perform the rerun executions and an amount of resources available to perform the rerun executions. For example, root cause analysis device 210 may cause more rerun executions of a non-deterministic test if the length of time to perform the rerun executions is less than a set time limit (e.g., the time to perform the rerun executions is short). As another example, root cause analysis device 210 may cause fewer rerun executions of the non-deterministic test if there are less than a predetermined number of resources available to execute the test (e.g., if there aren't enough resources available to perform the test a particular number of times). As yet another example, root cause analysis device may cause a static number of rerun executions and if the data captured from those rerun executions does not meet a threshold by which the data can be suitably analyzed (e.g., the data does not meet a particular threshold, such as a threshold based on a standard deviation of the data), root cause analysis device 110 may cause additional rerun executions until the threshold is reached. Examples of additional and/or alternate processes that may be performed when test rerun execution instructions 242 are executed are described in further detail below with respect to, for example, FIG. 3-5.

Data capture instructions 244 may function to capture data during the rerun executions of the non-deterministic test. In some implementations, the captured data may include application data, test data, and environment data. The application data may include data related to the AUT (e.g., execution flows of the AUT, such as execution flows performed during the rerun executions, AUT version, AUT code creator, etc.), the test data may include data related to the rerun executions of the test (e.g., tester name, test date/time, test status data (e,g., whether the test passed or failed), testing actions and/or steps performed during a particular test execution state, etc.), and the environment data may include data related to the environment of the AUT (e.g., data related to the hardware and programming that execute the AUT, such as device build, CPU usage, memory usage, resource usage, operating system, browser, server logs, etc.).

In some implementations, when data capture instructions 244 are executed by processor 220, data capture instructions 244 may cause processor 220 and/or another processor to capture data during the rerun executions of the non-deterministic test by accessing or otherwise obtaining data points from one or more computing systems that execute the test and/or implement the AUT during the non-deterministic test executions. In some examples, the data points may be captured by agents on various physical or virtual system components to monitor how the particular component(s) function and to transmit the data points to a storage device, such as data repository 140. The transmitted data points may then be received and/or captured by root cause analysis device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component(s) memory usage.

Figure 3:
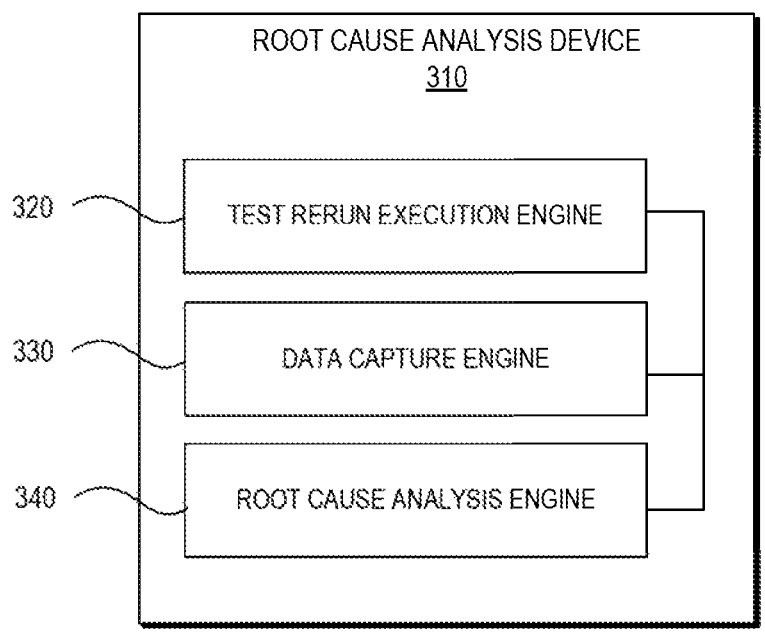
FIG. 3 is a block diagram of an example root cause analysis device consistent with disclosed implementations.
Figure 4:
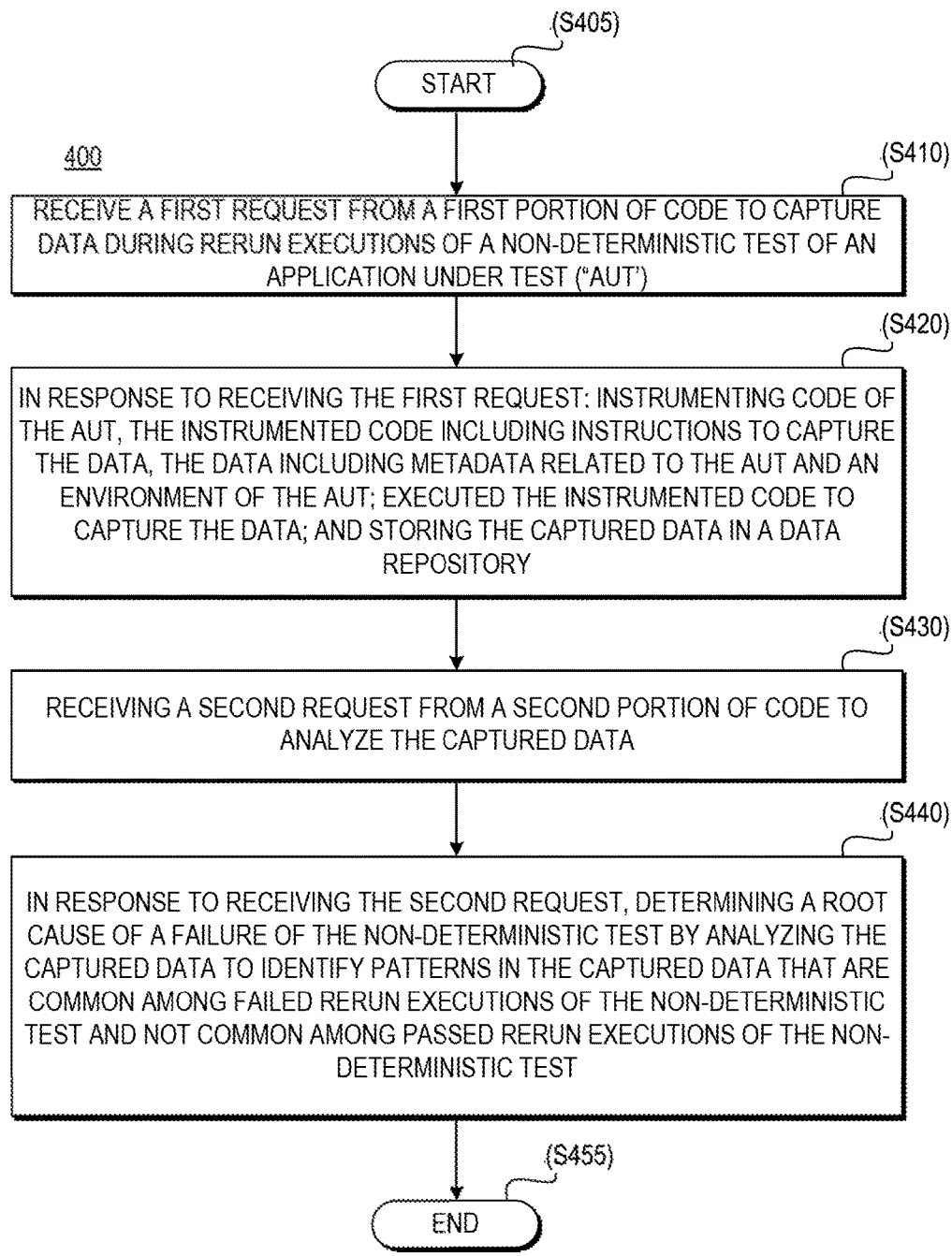
FIG. 4 is a flow chart of an example process for root cause analysis of non-deterministic tests consistent with disclosed implementations.
Figure 5:
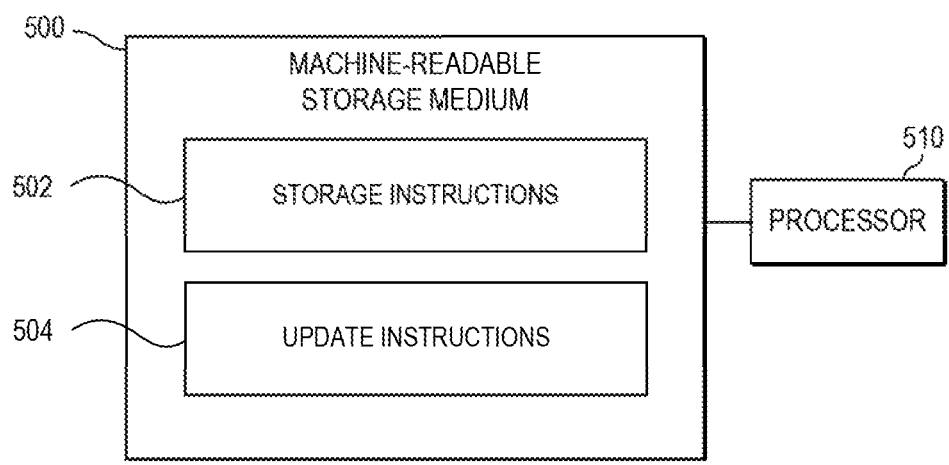
FIG. 5 is a block diagram of an example machine-readable storage medium consistent with disclosed implementations.

In some examples, data capture instructions 244, when executed, may capture data during the rerun executions of the non-deterministic test by identifying a portion of the application under test into which insertion of instrumentation code is desired and/or instrumenting the portion of the AUT with the instrumentation code. For example, root cause analysis device 244 may determine code of the AUT that is being tested by the non-deterministic test and based on the determination identify instrumentation points within the code where instrumentation code may be inserted. The code may be inserted into the instrumentation points and may be used to analyze the systems associated with the AUT and the test as the AUT and the test execute. In some examples, the instrumentation of the code may be used to determine a flow of the AUT (e.g., by tracking the method call chain and saving an image of the execution). For example, data capture instructions 244 may cause processor 220 and/or another processor to determine when an object is created on a thread by instrumenting a constructor of an object. For example, the AUT may include constructors (e.g., blocks of code that are executed to create an object) that may determine the actions taken when an object is created (e.g., the functions performed by the object). In some implementations, root cause analysis device 210 may automatically determine the creation of those objects by instrumenting the constructors of the objects by inserting instrumentation code to transmit execution flows to a storage device (e.g., data repository 140) in response to the object being created and/or the object being run. In some implementations, the execution flows may include information related to the action performed in response to the non-deterministic test (e.g., button click), information related to any object created in response to the action, the creating thread of the object, and the running thread of the object. Examples of additional and/or alternate processes that may be performed when data capture instructions 244 are executed are described in further detail below with respect to, for example. FIGS. 3-5.

Root cause analysis instructions 246 may function to analyze the captured data to determine a root cause of a failure of the non-deterministic test based on a comparison between failed rerun executions (i.e., those of the rerun executions that failed) and passed rerun executions (i.e., those of the rerun executions that passed). For example, when root cause analysis instructions 246 are executed by processor 220, root cause analysis instructions 246 may cause processor 220 to analyze the captured data by identifying patterns in the captured data such, as for example, by identifying patterns in the captured data that are common among failed rerun executions of the non-deterministic test and not common among passed rerun executions of the non-deterministic test. In some implementations, the patterns in the captured data may be identified based on an examination of attributes (characteristics) of the rerun executions of the non-deterministic test. For example, the attributes of the failed rerun executions may be compared to the attributes of the passed rerun executions and, based on the comparison, a determination may be made as to whether a difference between the attributes (e.g., a difference between the attributes of the failed rerun executions and the attributes of the passed rerun executions) is statistically significant. Any suitable attribute may be compared, including attributes based on execution flow, thread metrics, the environment of the AUT, the environment of the rerun executions of the non-deterministic test, and the like. If the difference between the attributes is statistically significant (e.g., an analysis of the data results in a particular p-value, the analysis of the data indicates that the results pass a particular threshold, etc.), then the difference may be identified as a pattern. Conversely, if the difference is not statistically significant, the difference may not be identified as a pattern. In some examples, the identified patterns may be considered to be potential root causes of the failure of the non-deterministic test.

As discussed above, in some implementations the analysis may be based on a comparison of execution flows. For example, the analysis may include a comparison between a number of faded rerun executions that perform a first particular flow and a number of passed rerun executions that perform the first particular flow. In this example, if an analysis of the capture data identifies a particular execution flow that is more prevalent in the failed rerun executions than the passed rerun executions (e.g., in 90% of the failed rerun executions the execution flow is (1) Method A, (2) Method B, and (3) Method C and in 85% of the passed rerun executions the execution flow is (1) Method A, (2) Method C, and (3) Method B). The particular execution flow may be identified as a potential root cause of the failure of the non-deterministic test. As another example, the analysis may include a comparison between a number of failed rerun executions that perform a second particular flow and pass a first parameter and a number of the passed rerun executions that perform the second particular flow and pass a second parameter. For example, an execution flow (e.g., the second particular flow) may be the same for failed rerun executions and passed rerun executions (e.g., (1) Method A, (2) Method B, (3) Method C) but the execution flows including the first parameter results, differ from the rerun execution failures (e.g., 40%) than the second parameter (e.g., 5%) by a particular amount (e.g., exceed a particular threshold). In this example, the particular parameter value that is passed may be identified as a potential root cause of the failure of the non-deterministic test.

As discussed above, in some implementations the analysis may be based on a comparison of thread metrics. For example, the analysis may include a comparison based on thread metrics for the rerun executions in their entirety, for particular points in time during the rerun executions, and/or the like. In some implementations, the analysis may be based on a comparison between a size of a thread count (e.g., a first thread count) of the faded rerun executions to a size of a thread count (e.g., a second thread count) of the passed rerun executions. For example, a particular number (e.g., 80%) of the failed rerun executions may have a thread counter that is greater than the thread count in passed rerun executions (e.g., greater by 30%).

As discussed above, in some implementations the analysis may be based on a comparison of the environment of the AUT and/or the environment of the rerun executions of the non-deterministic test. In some implementations, the analysis may include a comparison between environments related to the failed rerun executions and environments related to the passed rerun executions. For example, various metrics associated with the environments (e.g., CPU, memory, operating system, etc.) used during the failed rerun executions may be compared with the environments used during the passed rerun executions and any differences between the two that exceed a particular threshold may be identified. For example, a particular number of the failed rerun executions (75%) may have been tested on a first operating system type and a particular number of the passing rerun executions (e.g., 90%) were testing on a second operating system type. In this case, the first operating system type may be identified as a potential root cause of the failure. Examples of additional and/or alternate processes that may be performed when root cause analysis instructions 246 are executed are described in further detail below with respect to, for example, FIGS. 3-5.

FIG. 3 is a block diagram of an example root cause analysis device 310 consistent with disclosed implementations. In certain aspects, root cause analysis device 310 may correspond to root cause analysis device 110 of FIG. 1 and/or root cause analysis device 210 of FIG. 2 Device 310 may be implemented in various ways. For example, device 310 may be a special purpose computer, a server, a mainframe computer, and/or any other suitable type of computing system. In the example shown in FIG. 3, device 310 may include a test rerun execution engine 320, a data capture engine 330, and a root cause analysis engine 340.

Engines 320, 330, and 340 may be electronic circuitry for implementing functionality consistent with disclosed examples. For example, engines 320, 330, and 340 may represent combinations of hardware devices and programming to implement the functionality consistent with disclosed implementations. In some examples, the functionality of engines 320, 330, and/or 340 may correspond to operations performed by root cause analysis device 210 of FIG. 2, such as operations performed when non-deterministic test analysis instructions 240 are executed by processor 220 (described above with respect to FIG. 2). In FIG. 3, test rerun execution engine 320 may represent a combination of hardware and programming that performs operations similar to those performed when processor 220 executes test rerun execution instructions 242. Similarly, data capture engine 330 may represent a combination of hardware and programming that performs operations similar to those performed when processor 220 executes data capture instructions 244, and root cause analysis engine 340 may represent a combination of hardware and programming that performs operations similar to those performed when processor 220 executes root cause analysis instructions 246.

FIG. 4 is a flow chart of an example process 400 for root cause analysis of a non-deterministic test consistent with disclosed implementations. Although execution of process 400 is described below with reference to system 100 of FIG. 1, specific components of system 100, root cause analysis device 310, and/or specific components of root cause analysis device 310, other suitable systems and devices for execution of at least one step of process 400 may be used. For example, processes described below as being performed by root cause analysis device 110 may be performed by root cause analysis device 210, root cause analysis device 310, and/or any other suitable system. As another example, processes described below as being performed by root cause analysis device 110 may be performed by root cause analysis device 110, root cause analysis 210, and/or any, other suitable system. Process 400 may be implemented in the form of executable instructions stored on a machine-readable storage medium and/or in the form of electronic circuitry.

Process 400 may start (step S705) after a test of an AUT has been executed. For example, process 400 may start after a test has been executed, has been determined to be non-deterministic, and rerun executions of the non-deterministic test of the AUT are to be performed. In some implementations, process 400 may include receiving a first request from a first portion of code to capture data during the rerun executions of the non-deterministic test of the AUT (step S410). For example, the first request may be received via test rerun execution engine 320 of FIG. 3. In some implementations, root cause analysis device 110 may receive the first request after at least one component of system 100 transmits the first request to root cause analysis device 110. For example, when the first portion of code of code is executed by a processor, the first portion of code may cause the processor to, transmit the first request to root cause analysis device 110. The first portion of code may be stored in a non-transitory machine-readable storage medium associated with any suitable device within our outside of system 100. For example, root cause analysis device 110 itself may include the first portion of code. As another example, non-deterministic test instructions 125 of client device 120 may include the first portion of code and the execution of the first portion of code may change a testing application from a testing mode to a root cause analysis mode and/or may transmit a request to root cause analysis device 110 to capture data while the testing application is in root cause analysis mode.

In response to receiving the first request, process 400 may include instrumenting code of the AUT, executing the instrumented code to capture the data, and/or storing the captured data in a data repository (step S420). For example, the code may instrumented, executed, and/or stored via data capture engine 330 of FIG. 3. In some implementations, the instrumented code may include instructions to capture the data and/or the data may include metadata related to the AUT and an environment of the AUT. For example, root cause analysis device 110 may capture and/or store the data using one or more of the methods described above, Process 400 may also include receiving a second request from a second portion of code to analyze the captured data (step S430). For example, the second request may be received via root cause analysis engine 340 of FIG. 3. In some implementations, when the second portion of code is executed by a processor, the second portion of code may cause the processor to transmit the second request to root cause analysis device 110. The second portion of code may be transmitted from the same component as the first portion of code or may be transmitted from a different component. Furthermore, the first and second portions of code need not be stored at the same geographical locations or in the same device or system.

Process 400 may also include determining, in response to receiving the second request, a root cause of a failure of the non-deterministic test by analyzing the captured data to identify patterns in the captured data that are common among failed rerun executions of the non-deterministic test and not common among passed rerun executions of the non-deterministic test (step S440). For example, the determination may be performed via root cause analysis engine 340. In some implementations, root cause analysis engine may access the captured data stored in a data repository (e.g., data repository 140) to perform the analysis. The determination performed in step S440 may be similar or identical to that described above. For example, in some implementations, identifying the patterns may include comparing attributes of the failed rerun executions to the attributes of the passed rerun executions and determining, based on the comparison, whether a difference between the attributes is statistically significant. As another example, analyzing the captured data may include causing the display of information related to the patterns on a display device. For example, root cause analysis device 110 may identify the patterns as a potential cause of the failure and may transmit information related to the patterns to the device that is running in root cause analysis mode (e.g., display 126 of client device 120). In some implementations, the information may include the attributes that were compared (e.g., flow executions, passed variables, CPU usage, thread count, etc.) and statistics on the differences between the attributes. After the captured data has been analyzed to determine the root cause of the failure of the non-deterministic test, process 400 may end (step S455).

FIG. 5 is a block diagram of an example machine-readable storage medium 500 consistent with disclosed implementations. In certain aspects, machine-readable storage medium 500 may correspond with storage devices associated with system 100, root cause analysis device 210, root cause analysis device 310, and/or any other suitable storage device, Machine-readable storage medium 500 may be any electronic, magnetic, optical, or other physical storage device that stores executable instructions. Thus, machine-readable storage, medium 500 may be, for example, memory, a storage drive, an optical disc, and the like. In some implementations, machine-readable storage medium 500 may be a non-transitory machine-readable (e,g., computer-readable) storage medium, where the term 'non-transitory' does not encompass transitory propagating signals. Machine-readable storage medium 500 may be encoded with instructions that, when executed by a processor 510, perform operations consistent with disclosed implementations. For example, machine-readable storage medium 500 may include instructions that perform operations to manage the storage of captured data, such as the storage of data described in step structure in step S420 of FIG. 4. In the example shown in FIG. 5, machine-readable storage medium 500 may include storage instructions 502 and update instructions 504.

Storage instructions 502 may function to store captured data in a data repository. For example, when storage instructions 502 are executed by processor 510, storage instructions 502 may cause processor 510 to store captured data in a data repository, such as data repository 140. The captured data may include rerun execution data (e.g., first rerun execution data) related to a first set of rerun executions of a non-deterministic test of an AUT and may include execution flows, test status data, and/or environment data. The captured data may also include analysis data related to an analysis of the rerun execution data, the analysis data including patterns in the rerun execution, data that are common among failed rerun executions and not common among passed rerun executions. The data stored in data repository 140 may be captured and/or generated using the processes and/or components described above.

Update instructions 504 may function to update the analysis data based on a second set of rerun executions of the non-deterministic test. For example, root cause analysis device 110 may update and/or store the data after every rerun execution (e.g., in real-time) or may update and/or store the data after a plurality of rerun executions. For example, after the first set of rerun executions have been executed and the first rerun execution data has been captured and stored, the second set of rerun executions may be performed and data related to the second set of executions (e.g., second rerun execution data) may be stored. The additional data may be used to update the analysis data by identifying patterns in the first rerun execution data and the second set of rerun execution data that are common among the failed rerun executions in the first set of rerun executions and failed rerun executions in the second set of rerun executions and not common among the passed rerun executions in the first set of rerun executions and passed rerun executions in the second set of rerun executions. For example the first rerun execution data and the second rerun execution data may be combined and the combined data may be analyzed to identify the patterns. For example, when update instructions 504 are executed by processor 510, update instructions 504 may cause processor 510 to update the data structure to include additional patterns that have been identified based on additional test executions (e.g., based on the second set of rerun executions).

The disclosed examples may include systems, devices, machine-readable storage media, and methods for root cause analysis of non-deterministic tests. For purposes of explanation, certain examples are described with reference to the components illustrated in at least one of FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are only used to distinguish one element from another.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-5. Thus, the present disclosure merely sets forth possible examples of implementations, and many variations and modifications may be made to the described examples. For example, while various implementations describe capturing data through agent monitoring, agentless monitoring and/or instrumentation, any suitable method, of capturing data during the rerun executions may be used. As another example, while the patterns are identified based on comparisons between, for example, thread counts, particular flows, particular parameters, and the like, any suitable attribute for comparison may be used. As yet another example, while in some implementations root cause analysis engine 340 may receive the second request and analyze the captured data, data may be received from different components of root cause analysis engine 340 than those that analyze the captured data. All such modifications and variations, including these explicit examples, are intended to be included within the scope of this disclosure and protected by the following claims.

We claim:

1. A system for root cause analysis of non-deterministic tests comprising:
    a test rerun execution engine to cause, in response to detecting a non-deterministic test of an application under test, rerun executions of the non-deterministic test;
    a data capture engine to capture data during the rerun executions, the data including application data, test data, and environment data; and
    a root cause analysis engine to analyze the captured data to determine a root cause of a failure of the non-deterministic test by identifying patterns in the captured data, the analysis being based on a comparison between failed rerun executions of the rerun executions and passed rerun executions of the rerun executions,
        wherein the patterns are identified based on an analysis of the captured data, the analysis including at least one of:
            a comparison between a number of the failed rerun executions that perform a first particular flow and a number of the passed rerun executions that perform the first particular flow;
            a comparison between a number of the failed rerun executions that perform a second particular flow and pass a first parameter and a number of the passed rerun executions that perform the second particular flow and pass a second parameter;
            a comparison between a size of a first thread count of the failed rerun executions to a size of a second thread count of the passed rerun executions; or
            a comparison between an environment related to the failed rerun executions and an environment related to the passed rerun executions.

2. The system of claim 1, wherein the test rerun execution engine detects the non-deterministic test, the non-deterministic test being detected based on whether some original executions of the non-deterministic test have passed and some original executions of the non-deterministic test have failed without any changes to a code of the application under test or a code of the non-deterministic test.

3. The system of claim 1, wherein the test rerun execution engine determines a number of the rerun executions to execute based on at least one of a length of time to perform the rerun executions and an amount of resources available to perform the rerun executions.

4. The system of claim 1, wherein capturing the data includes:
    identifying a portion of the application under test into which insertion of instrumentation code is desired, the portion of the application being identified based on a code of the application under test being tested by the non-deterministic test; and
    instrumenting the portion of the application under test with the instrumentation code.

5. The system of claim 1, wherein:
the application data includes data related to the application under test, the data including execution flows of the application under test performed during the rerun executions;
the test data includes data related to the rerun executions of the test, the test data including test status data; and
the environment data includes data related to the environment of the application under test, the environment data including data related to hardware and programming that execute the application under test.

6. The system of claim 1, wherein identifying the patterns comprises:
comparing attributes of the failed rerun executions to attributes of the passed rerun executions;
determining, based on the comparison, whether a difference between the attributes of the failed rerun executions and the attributes of the passed rerun executions is statistically significant;
if the difference is statistically significant, identifying the difference as a pattern; and
if the difference is not statistically significant, not identifying the difference as a pattern.

7. A computer-implemented method comprising:
receiving, via a test rerun execution engine, a first request from a first portion of code to capture data during rerun executions of a non-deterministic test of an application under test;
in response to receiving the first request, and via a data capture engine:
instrumenting code of the application under test, the instrumented code including instructions to capture the data, the data including metadata related to the application under test and an environment of the application under test; and
executing the instrumented code to capture the data;
receiving, via a root cause analysis engine, a second request from a second portion of code to analyze the captured data; and
in response to receiving the second request, determining, via the root cause analysis engine, a root cause of a failure of the non-deterministic test by analyzing the captured data to identify patterns in the captured data that are common among failed rerun executions of the non-deterministic test and not common among passed rerun executions of the non-deterministic test,
wherein the patterns are identified based on an analysis of the captured data, the analysis including at least one of:
a comparison between a number of the failed rerun executions that perform a first particular flow and a number of the passed rerun executions that perform the first particular flow;
a comparison between a number of the failed rerun executions that perform a second particular flow and pass a first parameter and a number of the passed rerun executions that perform the second particular flow and pass a second parameter;
a comparison between a size of a first thread count of the failed rerun executions to a size of a second thread count of the passed rerun executions; or
a comparison between an environment related to the failed rerun executions and an environment related to the passed rerun executions.

8. The computer-implemented method of claim 7, wherein identifying the patterns includes:
comparing attributes of the failed rerun executions to attributes of the passed rerun executions; and
determining, based on the comparison, whether a difference between the attributes of the failed rerun executions and the passed rerun executions is statistically significant.

9. The computer-implemented method of claim 7, wherein:
the captured data is stored in a data repository; and
analyzing the captured data includes accessing the captured data stored in the data repository.

10. The computer-implemented method of claim 7, wherein analyzing the captured data includes causing the display of information related to the patterns.

11. A non-transitory machine-readable storage medium including instructions which, when executed by a processor, cause the processor to:
store captured data in a data repository, the captured data including:
rerun execution data related to a first set of rerun executions of a non-deterministic test of an application under test, the rerun execution data including execution flows, test status data, and environment data; and
analysis data related to an analysis of the rerun execution data, the analysis data including patterns in the rerun execution data that are common among failed rerun executions and not common among passed rerun executions,
wherein the patterns are based on an analysis of the rerun execution data, the analysis including at least one of:
a comparison between a number of the failed rerun executions that perform a first particular flow and a number of the passed rerun executions that perform the first particular flow;
a comparison between a number of the failed rerun executions that perform a second particular flow and pass a first parameter and a number of the passed rerun executions that perform the second particular flow and pass a second parameter;
a comparison between a size of a first thread count of the failed rerun executions to a size of a second thread count of the passed rerun executions; or
a comparison between an environment related to the failed rerun executions and an environment related to the passed rerun executions; and
update the analysis data based on a second set of rerun executions of the non-deterministic test.

12. The non-transitory machine-readable storage medium of claim 11, wherein:
the rerun execution data is a first rerun execution data;
data related to the second set of rerun executions is second rerun execution data; and
updating the analysis data includes identifying patterns in the first rerun execution data and the second rerun execution data that are common among the failed rerun executions in the first set of rerun executions and failed rerun executions in the second set of rerun executions and not common among the passed rerun executions in the first set of rerun executions and passed rerun executions in the second set of rerun executions.

13. The non-transitory machine-readable storage medium of claim 11, wherein the updating is performed in real-time.

* * * * *